(12) United States Patent
Kapur et al.

(10) Patent No.: US 8,744,351 B2
(45) Date of Patent: Jun. 3, 2014

(54) METHOD AND SYSTEM FOR REDUCING BURDEN ON A BLUETOOTH LOW POWER END-POINT DEVICE

(75) Inventors: Ash Kapur, Frederick, MD (US); Prasanna Desai, Elfin Forest, CA (US)

(73) Assignee: Broadcom Corporation, Irvine, CA (US)

( * ) Notice: Subject to any disclaimer, the term of this patent is extended or adjusted under 35 U.S.C. 154(b) by 942 days.

(21) Appl. No.: 12/546,638

(22) Filed: Aug. 24, 2009

(65) Prior Publication Data

US 2011/0021143 A1 Jan. 27, 2011

Related U.S. Application Data

(60) Provisional application No. 61/228,379, filed on Jul. 24, 2009.

(51) Int. Cl.
*H04B 7/00* (2006.01)
(52) U.S. Cl.
USPC ..................................................... 455/41.2
(58) Field of Classification Search
CPC .. H04L 63/0464; H04W 12/02; H04W 84/12; H04W 84/18; H04W 88/04
USPC ..................................................... 455/41.2
See application file for complete search history.

(56) References Cited

U.S. PATENT DOCUMENTS 6,014,085 A * 1/2000 Patel .............................. 455/410
2010/0120362 A1* 5/2010 Walley et al. ................. 455/41.2

OTHER PUBLICATIONS

Developers' Preview Bluetooth Low Energy Technology, Tokyo, Japan, Apr. 20, 2009.*
Specification of the Bluetooth System Covered Core Package version: 3.0 + HS Current Master TOC Publication data: Apr. 21, 2009.*

* cited by examiner

*Primary Examiner* — David Bilodeau
(74) *Attorney, Agent, or Firm* — McDermott Will & Emery LLP (57) ABSTRACT

A relay host wireless device is paired with a target host wireless device over a secure link. The relay host wireless device is operable to acquire link security information, which is associated with a link between the target host wireless device and a wireless end-point device, from the target host wireless device. The relay host wireless device is enabled to establish a link with the target host wireless device by faking its identity as an assumed identity of the target host wireless device. The acquired link security information is applied to the established link. The relay host wireless device is enabled to relay content between the target host wireless device and the wireless end-point device via the established fake link using said assumed identity of the target host wireless device and the secure link between the relay host wireless device and the target host wireless device, successively.

20 Claims, 6 Drawing Sheets

METHOD AND SYSTEM FOR REDUCING BURDEN ON A BLUETOOTH LOW POWER END-POINT DEVICE

CROSS-REFERENCE TO RELATED APPLICATIONS/INCORPORATION BY REFERENCE

This patent application makes reference to, claims priority to and claims benefit from U.S. Provisional Patent Application Ser. No. 61/228,379, which was filed on Jul. 24, 2009.

The above stated application is hereby incorporated herein by reference in its entirety.

FIELD OF THE INVENTION

Certain embodiments of the invention relate to wireless communication. More specifically, certain embodiments of the invention relate to a method and system for reducing burden on a low power Bluetooth end-point device.

BACKGROUND OF THE INVENTION

Bluetooth is a low-power, short-range wireless networking standard designed for local area voice and data transfer. Bluetooth radios operate in the unlicensed ISM band at 2.4 GHz with a set of 79 hop carriers with 1 MHz spacing. A master-slave communication model with frequency hopping spread spectrum (FHSS) transmission technique is adopted in the Bluetooth specification to ensure protection from interference and security of data. A collection of Bluetooth devices may be connected in an Ad Hoc fashion. The Bluetooth devices may connect to each other to form a network known as a piconet. One Bluetooth device may act as a master device for the piconet, while the other devices may concurrently operate as slave devices. At the maximum, 8 active Bluetooth devices may participate in the one piconet. Time may be divided into slots of 625 μs in the piconet. The master and slaves may alternate transmit opportunities in a time-division duplex (TDD) fashion. The master controls formation of Bluetooth communication links and communication procedures with slaves within the piconet. A slave may be enabled to transmit only after being polled by the master.

Bluetooth low energy (BLE) is a low power Bluetooth protocol for small, button cell battery-powered devices, such as, for example, watches, wireless keyboards, and gaming and sports sensors. These BLE devices may connect to Bluetooth-enabled host devices, whether computers or mobile phones. The host devices may also be some new devices designed for communicating with BLE devices for medical, sports, fitness, and watch markets, for example.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method is provided for reducing burden on an ultra low power sensor, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for reducing burden on a low power Bluetooth end-point device. In accordance with various embodiments of the invention, a relay host wireless device may be paired with a target host wireless device of a wireless end-point device. The relay host wireless device and the target host wireless device may be trusted devices with respect to each other. The relay host wireless device may be enabled to acquire link security information, for example, Encrypted Diversifier (EDIV), Rand (64-bit random number), Long Term Key (LTK) and Identify Resolving Key (IRK), from the target host wireless device. The acquired link security information may be associated with a link between the target host wireless device and the wireless sensor device. The relay host wireless device may be enabled to establish a link or connection with the wireless sensor device by applying the acquired link security information using an assumed identity of the target wireless device. The established link or connection may be utilized by the relay host wireless device to relay content between the target host wireless device and the wireless sensor device. The relay host wireless device may be enabled to communicate with the wireless sensor device and the target host wireless device using a Bluetooth protocol or a Bluetooth low energy (BLE) protocol. The acquired link security information from the target host wireless device may be created by a bonding procedure, which occurs between the target host wireless device and the wireless sensor device. Content may be relayed by the relay host wireless device between the target host wireless device and the wireless sensor device even without establishing a link or connection between the target host wireless device and the wireless sensor device. The relay wireless host device may be enabled to relay content between the target wireless host device and the wireless sensor device over the established link or connection using an assumed identity of the target wireless device and a secure link between the relay host wireless device and the target host wireless device, successively.

Figure 1:
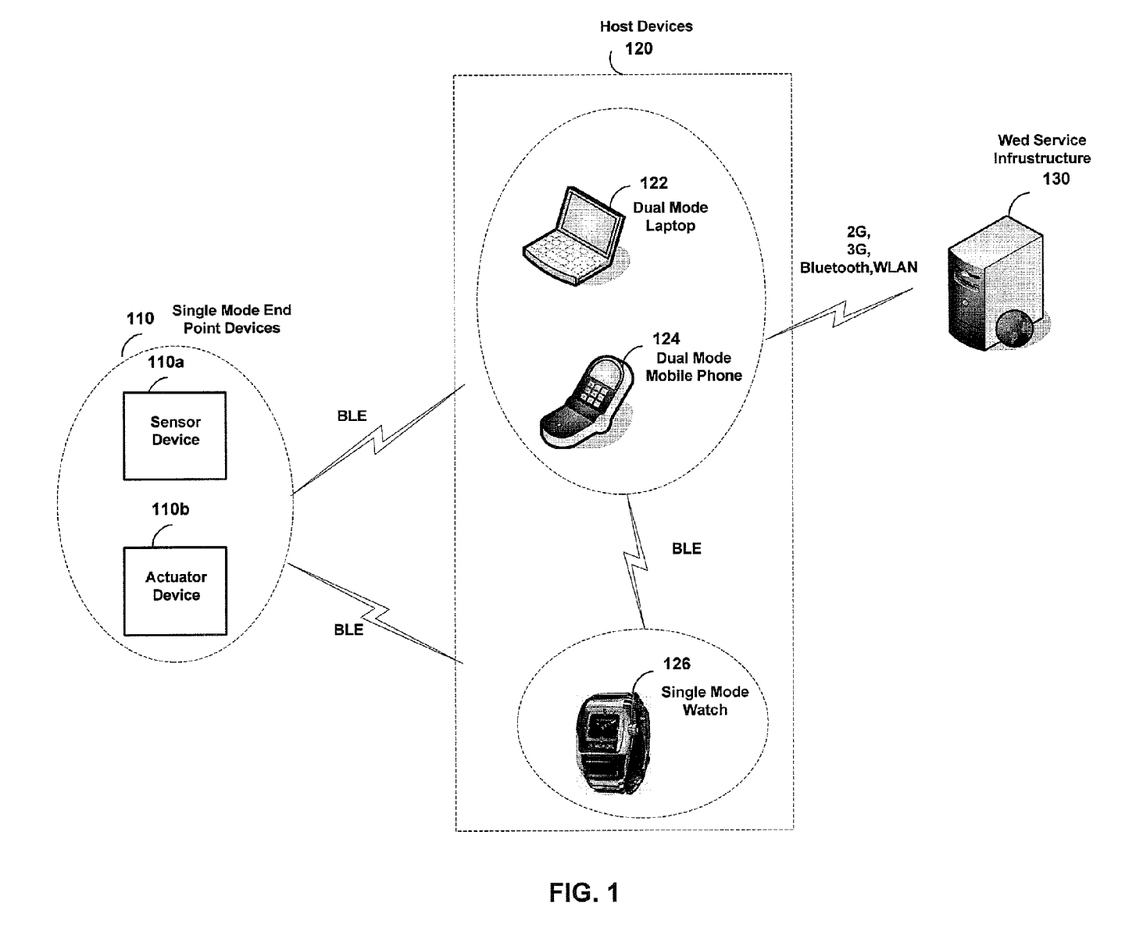
FIG. 1 is an exemplary BLE system that is operable to reduce burden to a wireless end-point device via a relay node, in accordance with an embodiment of the invention.

FIG. 1 is an exemplary BLE system that is operable to reduce burden to a wireless end-point device via a relay node, in accordance with an embodiment of the invention. Referring to FIG. 1, there is shown a plurality of single mode BLE end point devices 110, a plurality of host devices 120, and web service infrastructure 130. The plurality of single mode end-point devices 110 may comprise a sensor device 110a and an actuator device 110b. The plurality of host devices 120 may comprise a dual mode laptop 122, a dual mode (DUMO) mobile phone 124, and a single mode watch 126.

The plurality of single mode end-point devices 110, such as the sensor device 110a, may comprise suitable logic circuitry, interfaces and/or code that may be enabled to collect data from a target device and communicate the collected data with other powerful host devices for analysis. The sensor device 110a may be configured to communicate with host devices using various standard wireless communication protocols such as, for example, Bluetooth low energy (BLE) protocol. The sensor device 110a may be, for example, a BLE-enabled blood pressure monitor, a BLE-enabled weight scale, a BLE-enabled glucose meter, a BLE-enabled fitness monitor, and/or a BLE-enabled medication monitor.

The host devices 120 may comprise suitable logic circuitry and/or code that may be enabled to handle data received from the plurality of single mode end-point devices 110 to create various functions such as, for example, sport and medical diagnosis. A host device may be a dual mode BLE device such as the dual mode mobile phone 124 or a single mode BLE device such as the single mode watch 126.

The dual mode mobile phone 124 may be enabled to communicate with the plurality of single mode end-point devices 110 such as the sensor device 110a as well as the web service infrastructure 130. The dual mode mobile phone 124 may be capable of transmitting and/or receiving radio signals using BLE protocols with, for example, the sensor device 110a. The dual mode mobile phone 124 may be capable of communicating with the web service infrastructure 130 using various telecommunication standard protocols such as, for example, 3GPP, 3GPP2, WiFi, traditional Bluetooth, and/or WiMAX. The dual mode mobile phone 124 may be configured to shift to a BLE mode of operation when communicating with the sensor device 110a. In the BLE mode, the dual mode mobile phone 124 may be enabled to utilize BLE protocols to communicate with the plurality of single mode end-point devices 110 such as the sensor device 110a. The dual mode mobile phone 124 may be enabled to create applications from information captured by the sensor device 110a using the available resources such as computer power and/or memory. The dual mode mobile phone 124 may be configured to shift into a non-BLE mode of operation, for example a traditional Bluetooth mode, when the dual mode mobile phone 124 may be called upon to transport, for example, an audio stream to and/or from a Bluetooth enabled device such as a Bluetooth headset.

In various embodiments of the invention, the dual mode mobile phone 124 may be enabled to relay content such as multimedia content between the sensor device 110a and the single mode watch 126. In this regard, the dual mode mobile phone 124 may be enabled to establish a link or connection with the single mode watch 126. The dual mode mobile phone 124 and the single mode watch 126 may be paired as a trusted device with respect to each other. Content associated with the single mode watch 126 may be shared with the dual mode mobile phone 124 over the established link or connection. For example, the shared content associated with the single mode watch 126 may comprise link security information, which may be communicated between the single mode watch 126 and a single mode end-point device such as the sensor device 110a. Once being disconnected with the dual mode mobile phone 124, the single mode watch 126 may not locally save the shared content such as the link security information like EDIV, Rand, LTK and IRK. In this regard, the dual mode mobile phone 124 may be enabled to establish a link or connection with the sensor device 110a by, for example, faking its identity as an assumed identity of the single mode watch 126.

The shared link security information may be applied to the established link or connection. The dual mode mobile phone 124 may be configured to relay content between the sensor device 110a and the single mode watch 126 over the established link or connection with the sensor device 110a using the assumed identity of the single mode watch 126 and the established link or connection with the single mode watch 126. For example, content relayed from the sensor device 110a may comprise display information that may need to be displayed on the single mode watch 126. Content relayed from the single mode watch 126 may comprise instructions to the sensor device 110a to wake up the sensor device 110a to start collecting sensor data for the single mode watch 126.

The single mode watch 126 may comprise suitable logic, circuitry, interfaces and/or code that may be enabled to communicate with various end-point devices such as the sensor device 110a. The single mode watch 126 may be enabled to create applications from information captured by the sensor device 110a. For example, the single mode watch 126 may be configured to display information such as speed running and heart rate collected from the sensor device 110a. Moreover, the single mode watch 126 may be enabled to provide instructions to the sensor device 110a, for example, to wake the sensor device 110a up to start collecting required data such as heart rate and running speed for the single mode watch 126. In this regard, content such as instructions to the sensor device 110a from the single mode watch 126 may be relayed by the dual mode mobile phone 124 to the sensor device 110a. The single mode watch 126 may be bonded with the sensor device 110a to save relevant bonding information like link security information, for example, a link key and/or device identity, for purposes of link reconnection. Once being disconnected with the single mode watch 126, the sensor device 110a may not locally save the relative bonding information such as the link security information. In this regard, instead of reconnecting with the sensor device 110a, the single mode watch 126 may be enabled to establish a link or connection with a relay node such as the dual mode mobile phone 124 to share the relevant context that may be relayed to the sensor device 110a over the established link or connection with the dual mode mobile phone 124.

The web service infrastructure 130 may comprise suitable logic circuitry and/or code that may be enabled to create various services such as, for example, news, weather and sports, diagnostic information, and/or consulting. The web service infrastructure 130 may be enabled to provide created services to various host wireless devices such as, for example, the dual mode mobile phone 124, over 2G, 3G, Bluetooth, and/or WLAN communication networks.

In operation, a host wireless device, such as the single mode watch 126, may be enabled to bond with a wireless end-point device such as the sensor device 110a. Associated link security information such as a link key may be retained or stored at both the single mode watch 126 and the sensor device 110*a*. Once being disconnected with the single mode watch 126, the sensor device 110*a* may not locally save the relative bonding information such as the link security information. The stored link security information may be utilized by the single mode watch 126 for re-establishing the link or connection with the sensor device 110*a*. The single mode watch 126 may be configured to establish a link or connection with, for example, a host wireless device such as the dual mode mobile phone 124. The single mode watch 126 may be enabled to share the stored link information associated with the single mode watch 126 and the sensor device 110*a* with the dual mode mobile phone 124. The dual mode mobile phone 124 may be enabled to establish a link or connection with the sensor device 110*a* by faking its identity as an assumed identity of the single mode watch 126. The shared link information associated with the single mode watch 126 and the sensor device 110*a* may be applied to the established link or connection. The established link or connection may be utilized by the dual mode mobile phone 124 to relay content between the single mode watch 126 and the sensor device 110*a* using the assumed identity of the single mode watch 126. The relayed content from the single mode watch 126 may comprise instructions to the sensor device 110*a*. The relayed content from the sensor device 110*a* may comprise, for example, display information that may need to be displayed by the single mode watch 126.

Figure 2:
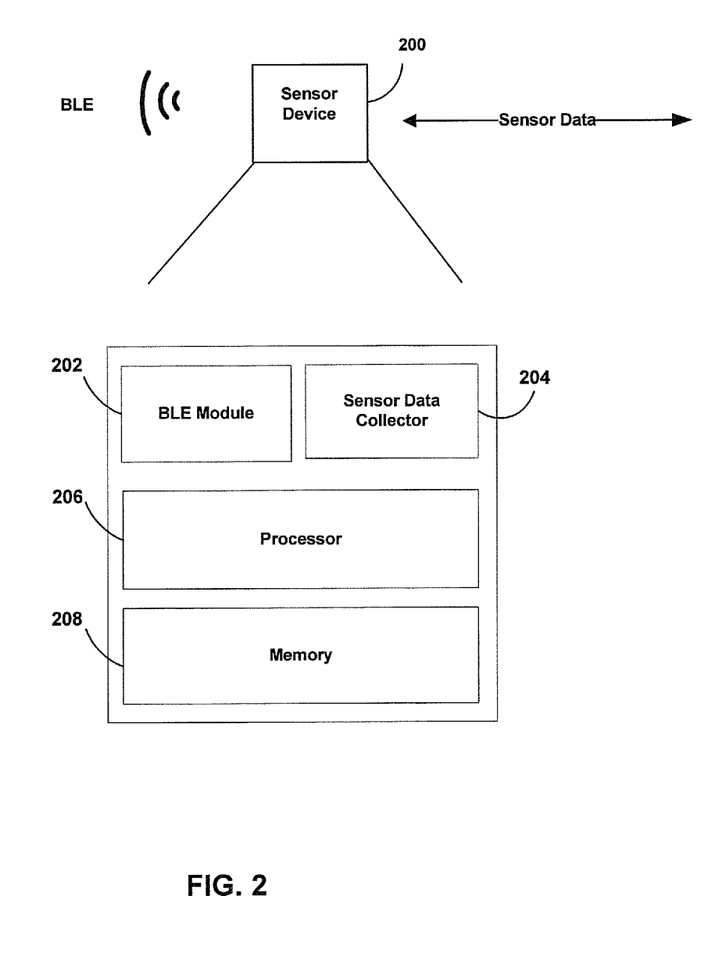
FIG. 2 is a block diagram that illustrates an exemplary wireless end-point device that is enabled to communicate content with a target wireless device via a relay node, in accordance with an embodiment of the invention.

FIG. 2 is a block diagram that illustrates an exemplary wireless end-point device that is enabled to communicate content with a target wireless device via a relay node, in accordance with an embodiment of the invention. Referring to FIG. 2, there is shown a wireless end-point device such as a BLE sensor device 200. The BLE sensor device 200 comprises a BLE module 202, a sensor data collector 204, a processor 206, and a memory 208.

The BLE module 202 may comprise suitable logic, circuitry, interfaces and/or code that may be enabled to transmit and/or receive radio signals over BLE air interface and convert them to corresponding signals, which may be suitable for further processing in the processor 206.

The sensor data collector 204 may comprise suitable logic, circuitry, interfaces, and/or code that may be enabled to collect sensor data from a target device. The collected data may be communicated with various powerful host devices such as a PC and/or a mobile phone for further analysis.

The processor 206 may comprise suitable logic, circuitry, interfaces and/or code that may be enabled to perform a variety of signal processing tasks and may comprise controlling of the BLE module 202 as well as the sensor data collector 204, for example. The processor 206 may be enabled to process various sensor data collected from the target device via the sensor data collector 204. The various collected sensor data may comprise, for example, running speed, body temperature, and/or blood pressure. The collected sensor data may be communicated via the BLE module 202 with a BLE-enabled host device such as the dual mode mobile phone 124 and/or the single mode watch 126, for further analysis. In this regard, the collected sensor data may be relayed to a target wireless device such as the single mode watch 126 via a relay node such as the dual mode mobile phone 124.

The processor 206 may be enabled to access the memory 208 to retrieve stored link security information for delivering the collected sensor data. The stored link security information may be associated with a link between the single mode watch 126 and the BLE sensor device 200. The processor 206 may be enabled to communicate with the relay node such as the dual mode mobile phone 124 to establish a link or connection using the retrieved link security information and an assumed identity of the single mode watch 126. The relay node may be enabled to fake its identity as the assumed identity of the single mode watch 126 for establishing the link or connection. Content such as, for example, the collected sensor data from the sensor data collector 204 may be communicated with the relay node via the BLE module 202 over the established fake link or connection. The relay node such as the dual mode mobile phone 124 may be enabled to receive and relay the collected sensor data to the single mode watch 126, accordingly.

The memory 208 may comprise suitable logic, circuitry, interfaces and/or code that may enable storage of data and/or other information utilized by the processor 206. For example, the memory 208 may be utilized to store collected sensor data from the sensor data collector 204. The memory 208 may be enabled to store executable instructions received from the BLE module 202 to wake up or turn off, for example, the sensor data collector 204. The memory 210 may comprise RAM, ROM, low latency nonvolatile memory such as flash memory and/or other suitable electronic data storage capable of storing data and instructions.

In operation, the BLE sensor device 200 may be enabled to collect sensor data from a target object via the sensor data collector 204. The sensor data may comprise, for example, blood pressure and/or running speed of the target object. The collected sensor data may be communicated with the processor 206 to be delivered to a target device such as the single mode watch 126 via the BLE module 202. The processor 206 may be enabled to access the memory 208 to retrieve link security information associated with a link between the BLE sensor device 200 and the single mode watch 126. The retrieved link security information may be utilized by the processor 206 to establish a link or connection with a relay node such as the dual mode mobile phone 124 using an assumed identity of the single mode watch 126. The established fake link or connection may be utilized to relay sensor data collected by the sensor data collector 204 to the single mode watch 126.

Figure 3:
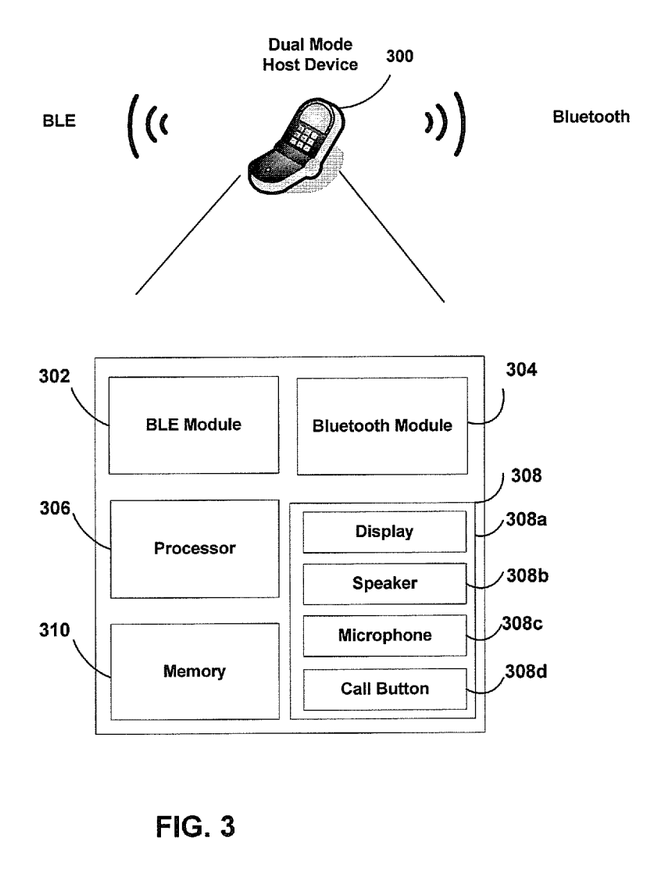
FIG. 3 is a block diagram that illustrates an exemplary wireless relay node that is enabled to relay content between a wireless end-point device and a target wireless device, in accordance with an embodiment of the invention.

FIG. 3 is a block diagram that illustrates an exemplary wireless relay node that is enabled to relay content between a wireless end-point device and a target wireless device, in accordance with an embodiment of the invention. Referring to FIG. 3, there is shown a wireless relay node such as a dual mode BLE host device 300. The dual mode BLE host device 300 comprises a BLE module 302, a Bluetooth module 304, a processor 306, a user interface 308, and a memory 310. The user interface 308 may comprise a display 308*a*, a speaker 308*b*, a microphone 308*c*, and a call button 308*d*.

The BLE module 302 may comprise suitable logic, circuitry, interfaces and/or code that may be enabled to transmit and/or receive signals over BLE air interface and communicate with the processor 306 for further processing.

The Bluetooth module 304 may comprise suitable logic, circuitry, interfaces and/or code that may be enabled to transmit and/or receive signals over the Bluetooth air-interface. The Bluetooth module 304 may be enabled to communicate the signals with the processor 306 for further processing.

The processor 306 may comprise suitable logic, circuitry, interfaces and/or code that may be enabled to perform a variety of signal processing tasks associated with the BLE module 302 and/or the Bluetooth module 304. The processor 306 may comprise controlling of the BLE module 302 as well as the Bluetooth module 304. The processor 306 may be configured to relay content between a BLE-enabled wireless end-point device such, as the sensor device 110*a*, and a target host wireless device such as the single mode watch 126. The processor 306 may be enabled to relay content from the sensor device 110a to the single mode watch 126. The relayed content may comprise various sensor data such as, for example, running speed and blood pressure, collected by the sensor device 110a. The relayed sensor data may be further analyzed via the target host wireless device, such as the single mode watch 126, an utilized to provide various functions such as, for example, health diagnosis and fitness.

The processor 306 may be enabled to relay content from the single mode watch 126 to the sensor device 110a. The relayed content may comprise instructions, for example, to wake up the sensor device 110a to start collecting sensor data and/or sending to the collected sensor data to the single mode watch 126. In this regard, the dual mode BLE host device 300 may be enabled to establish a link or connection with the single mode watch 126. The dual mode BLE host device 300 may be enabled to acquire link security information associated with the single mode watch 126 and the sensor device 110a over the established link or connection. The processor 306 may be enabled to establish a link or connection using the acquired link security information. The processor 306 may be configured to fake device identity as an assumed identity of the single mode watch 126 for establishing the link or connection. The processor 306 may be enabled to relay content between the sensor device 110a and the single mode watch 126 using the established link or connection. Moreover, the processor 306 may be configured to communicate content between the sensor device 110a and the single mode watch 126 with, for example, the web service infrastructure 130, via the Bluetooth module 304 to create desired applications, if needed.

The user interface 308 may comprise suitable logic, circuitry, interfaces and/or code that may comprise a plurality of associated components such as the display 308a, the speaker 308b, the microphone 308c, and the call button 308d. The display 308a may enable presentation or display graphics and/or text. In this regard, applications created from sensor data collected by the sensor device 110a may be presented, if needed, as image data on the display 308a and/or as voice via the speaker 308b. In this regard, applications created from sensor data may be presented to user of the dual mode host device 300 by, for example, pressing the call button 308d and/or generating an audio indicator through the microphone 308c.

Although a relay node is illustrated in FIG. 3 as the dual mode BLE host device 300, the invention is not so limited. In this regard, the relay node may be a single mode BLE host device. The BLE module 302, the processor 306, the user interface 308 may be operable to support corresponding single mode operations as a relay node without departing from the spirit and scope of the various embodiments of the invention.

In operation, the dual mode BLE host device 300 may be configured to relay content between a wireless end-point device such as the sensor device 110a and a target wireless device such as the single mode watch 126. The processor 306 may be enabled to communicate content with the sensor device 110a and/or the single mode watch 126 via the BLE module 302. The link security information associated with the sensor device 110a and the single mode watch 126 may be provided by the single mode watch 126 to the dual mode host device 300. The processor 306 may be configured to fake the identity of the dual mode BLE host device 300 as an assumed identity of the single mode watch 126 in order to establish a link or connection with the sensor device 110a using the provided link security information. The established link or connection may be utilized by the dual mode BLE host device 300 to relay content between the sensor device 110a and the single mode watch 126. The relayed content, which is to be presented to user of the single mode watch 126, may also be communicate to and/or made available to other authorized users such as, for example, user of the dual mode host device 300 via the display 308a and/or the speaker 308b, and/or users of other Bluetooth enabled host devices through the Bluetooth module 306.

Figure 4:
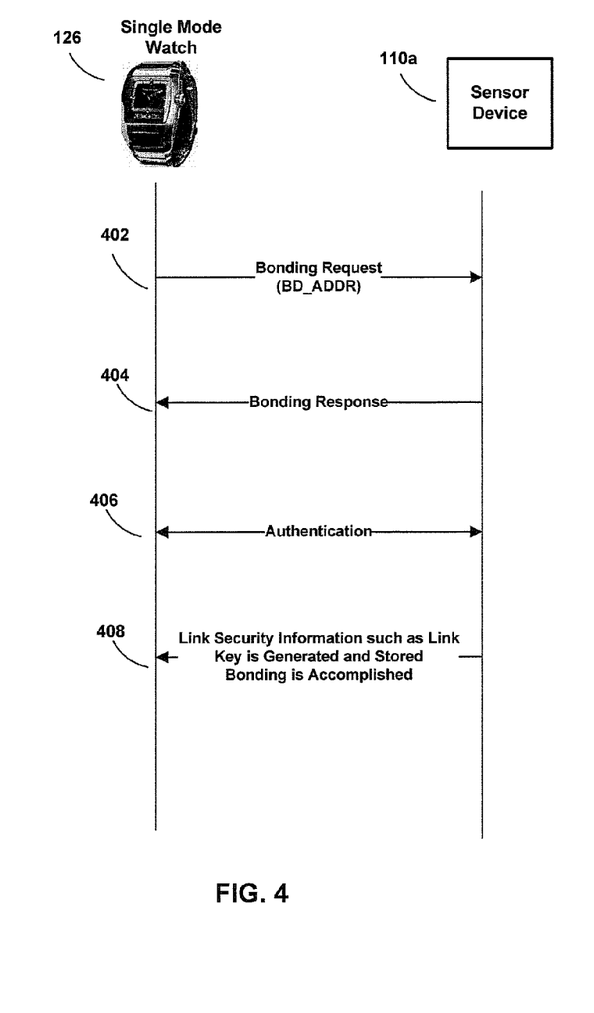
FIG. 4 is a flow diagram that illustrates exemplary steps for bonding a wireless end-point device and a target wireless device, in accordance with an embodiment of the invention.

FIG. 4 is a flow diagram that illustrates exemplary steps for bonding a wireless end-point device and a target wireless device, in accordance with an embodiment of the invention. Referring to FIG. 4, the exemplary steps begin with step 402, where a target wireless device such as the single mode watch 126 may be enabled to send a bonding request to a wireless end-point device such as the sensor device 110a to initiate a bonding procedure. The bonding request may comprise a device identity such as Bluetooth device address (BD_ADDR) of the single mode watch 126. In step 404, upon receipt of the bonding request, the sensor device 110a may be operable to accept the bonding request according to the received device identity such as BD_ADDR. The sensor device 110a may be configured to send a bonding response to the single mode watch 126 to inform of the receipt and/or acceptance of the bonding request.

In step 406, an authentication procedure may be performed between the sensor device 110a and the single mode watch 126 to create a secure and/or trusted relationship between the two devices. The authentication procedure may involve an exchange of secret information such as a PIN to ensure that only authorized devices have access to particular content. In step 408, link security information such as a link key between the sensor device 110a and the single mode watch 126 may be created and stored at the single mode watch 126 and the sensor device 110a, respectively. In this regard, the created link security information may be shared by a relay node such as the dual mode mobile phone 124 for subsequently encrypting content relayed between the single mode watch 126 and the sensor device 110a.

Figure 5:
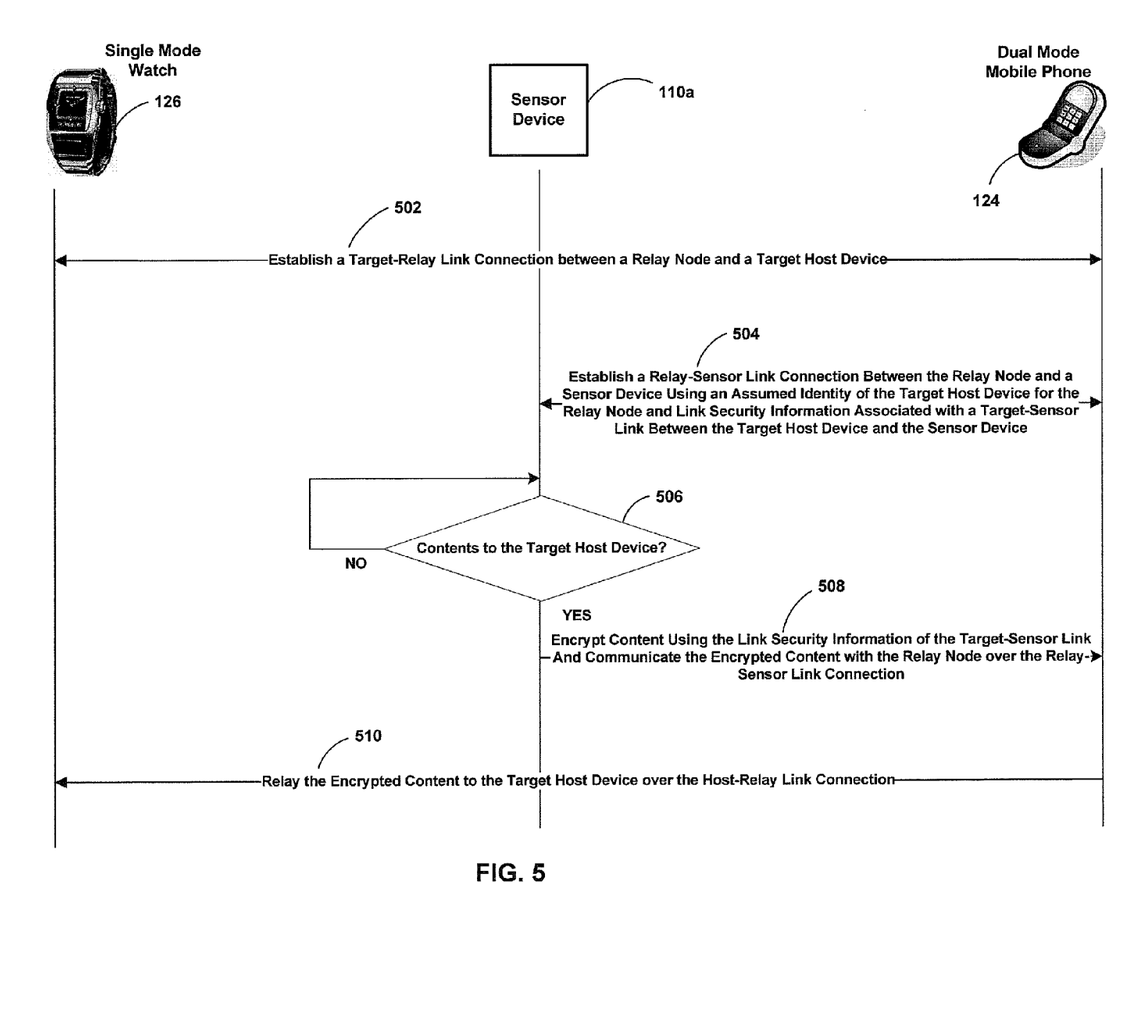
FIG. 5 is a flow diagram that illustrates exemplary steps for relaying content from a wireless sensor device to a target wireless device via a link or connection established between the wireless sensor device and a relay node using an assumed identity of the target wireless device, in accordance with an embodiment of the invention.

FIG. 5 is a flow diagram that illustrates exemplary steps for relaying content from a wireless sensor device to a target wireless device via a link or connection established between the wireless sensor device and a relay node using an assumed identity of the target wireless device, in accordance with an embodiment of the invention. Referring to FIG. 5, the exemplary steps begin in step 502, where a target wireless device such as the single mode watch 126 may be enabled to establish a target-relay link or connection with a relay node such as the dual mode mobile phone 124. In step 504, the dual mode mobile phone 124 may be enabled to establish a relay-sensor link or connection with the sensor device 110a by faking its identity such as BD_ADDR as an assumed identity of the single mode watch 126. Link security information may be acquired from the single mode watch 126 by the dual mode mobile phone 124 over the established target-relay link or connection. The acquired link security information may be associated with a target-sensor link or connection between the sensor device 110a and the single mode watch 126. The acquired link security information may be created via a bonding procedure as described, for example, with respect to FIG. 4. The created link security information may be stored at both the sensor device 110a and the single mode watch 126. In step 506, it may be determined whether the sensor device 110a may have content that needs to be communicated to the single mode watch 126. In instances where it may be determined that the sensor device 110a may have content that need to be communicated to the single mode watch 126, then in step 508, the sensor device 110a may be enabled to encrypt related content using stored link security information associated with the target-sensor link or connection between the sensor device 110a and the single mode watch 126. The encrypted content may be communicated with the dual mode mobile phone (the relay node) over the established relay-sensor link or connection using the assumed identity of the single mode watch 126. In step 510, the dual mode mobile phone 124 may be enabled to relay the received encrypted content from the sensor device 110a to the single mode watch 126 over the established target-relay link or connection.

Figure 6:
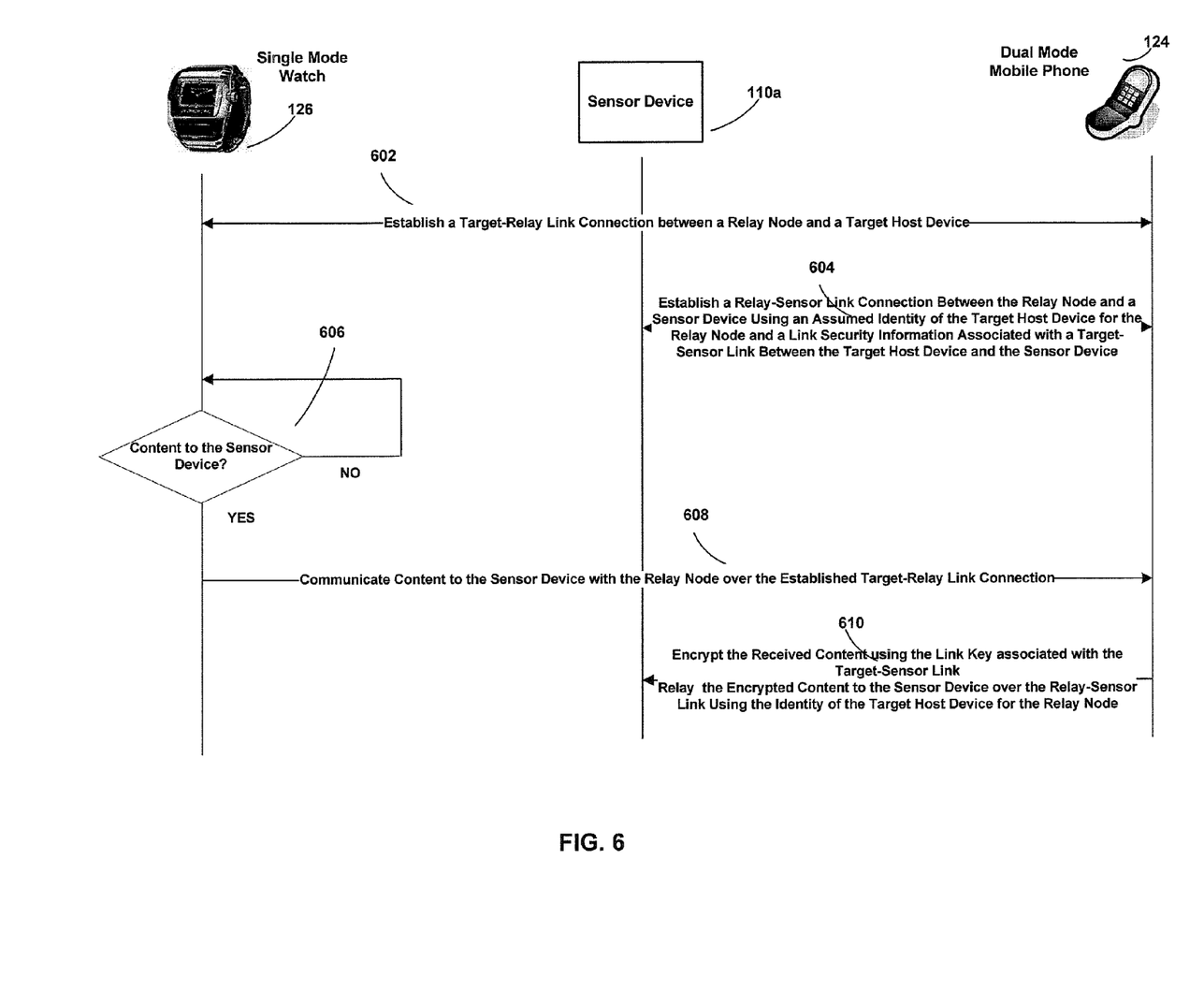
FIG. 6 is a flow diagram that illustrates exemplary steps for relaying content from a target wireless device to a wireless sensor device via a link or connection established between the wireless sensor device and a relay node using an assumed identity of the target wireless device, in accordance with an embodiment of the invention.

FIG. 6 is a flow diagram that illustrates exemplary steps for relaying content from a target wireless device to a wireless sensor device via a link or connection established between the wireless sensor device and a relay node using an assumed identity of the target wireless device, in accordance with an embodiment of the invention. Referring to FIG. 6, the exemplary steps begin in step 602, where a target wireless device such as the single mode watch 126 may be enabled to establish a target-relay link or connection with a relay node such as the dual mode mobile phone 124. In step 604, the dual mode mobile phone 124 may be operable to establish a relay-sensor link or connection with the sensor device 110a by faking its identity such as BD_ADDR as an assumed identity of the single mode watch 126. Link security information may be acquired from the single mode watch 126 by the dual mode mobile phone 124 over the established target-relay link or connection. The acquired link security information may be associated with a target-sensor link or connection between the sensor device 110a and the single mode watch 126. The acquired link security information may be created via a bonding procedure, for example, as described with respect to FIG. 4. The created link security information may be stored at both the sensor device 110a and the single mode watch 126.

In step 606, it may be determined whether the single mode watch 126 may have content that needs to be communicated to the sensor device 110a. In instances where it may be determined that the single mode watch 126 may have content that needs to be sent to the sensor device 110a, then in step 608, the single mode watch 126 may be operable to communicate content to the sensor device 110a with the dual mode mobile phone 124 (the relay node) over the established target-relay link or connection. In step 610, the dual mode mobile phone 124 may be operable to encrypt the received content using the acquired link security information associated with the target-sensor link. The dual mode mobile phone 124 may be configured to relay the encrypted content to the sensor device 110a over the established relay-sensor link or connection using the assumed identity of the single mode watch (the target device), accordingly.

Aspects of a method and system for reducing burden on a low power Bluetooth end-point device are provided. In accordance with various embodiments of the invention, a relay host wireless device such as the dual mode mobile phone 124 may be operable to pair with a target host wireless device such as the single mode watch 126 of a single mode end-point device such as the sensor device 110a. The dual mode mobile phone 124 and the single mode watch 126 may be trusted devices with respect to each other. The single mode watch 126 may be operable to share information with the dual mode mobile phone 124. For example, the dual mode mobile phone 124 may be enabled to acquire link security information from the single mode watch 126. The acquired link security information may be associated with a link between the single mode watch 126 and the sensor device 110a.

The dual mode mobile phone 124 may be operable to establish a link or connection with the single mode watch 126 by faking its identity as an assumed identity of the single mode watch 126. The acquired link security information may be applied to the established link or connection. As described with respect to FIGS. 5-6, the established link or connection may be utilized by the dual mode phone 124 to relay content between the sensor device 110a and the single mode watch 126. The dual mode mobile phone 124 may be enabled to communicate with the sensor device 110a and the single mode watch 126 using a Bluetooth protocol or a low power Bluetooth protocol. The identity of the single mode watch may be associated with the Bluetooth device address (BD_ADDR), which may be assigned by the dual mode mobile phone 124. The acquired link security information from the single mode watch 126 may be created by a bonding procedure as described with respect to, for example FIG. 4, between the single mode watch 126 and the sensor device 110a.

Content may be relayed by the dual mode mobile phone between the single mode watch 126 and the sensor device 110a even without establishing a link or connection between the single mode watch 126 and the sensor device 110a. A secure link or connection may be established for communicating information between the single mode watch 126 and the dual mode mobile device 124. The dual mode mobile phone 124 may be operable to relay content from the single mode watch over the established secure link or connection and the established link or connection using the assumed identity of the single mode watch 126. The relayed content from the single mode watch may comprise instructions to the sensor device 110a to collect content for the single mode watch 126. The collected content may be relayed by the dual mode mobile phone 124 to the single mode watch 126 over the established link or connection using the assumed identity of the single mode watch 126 and the established secure link or connection. The relayed collected content from the sensor device 110a may be presented as visual data and/or audio data over the single mode watch 126.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for reducing burden on a low power Bluetooth end-point device.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communication, the method comprising:
acquiring, by a host wireless device, link security information from a trusted wireless device;
establishing, by and through said host wireless device, a link between a wireless end-point device and said trusted wireless device using said acquired link security information and an assumed identity of said trusted wireless device;
relaying, by and through said host wireless device, content between said wireless end-point device and said trusted wireless device via said established link using said assumed identity of said trusted wireless device; and
communicating, by said host wireless device, at least part of said content relayed between said wireless end-point device and said trusted wireless device to a service infrastructure device.

2. The method according to claim 1, wherein establishing a link comprises establishing at least one of a Bluetooth protocol or Bluetooth low energy protocol link.

3. The method according to claim 1, wherein, before said link security information is acquired by said host wireless device from said trusted wireless device, said link security information is shared between said trusted wireless device and said wireless end-point device by bonding said trusted wireless device with said wireless end-point device.

4. The method according to claim 1, wherein relaying said content between said wireless end-point device and said trusted wireless device comprises relaying said content without a concurrent link being established between said wireless end-point device and said trusted wireless device.

5. The method according to claim 1, comprising establishing a link between said host wireless device and said trusted wireless device.

6. The method according to claim 5, comprising relaying said content from said trusted wireless device to said wireless end-point device over said established link between said host wireless device and said wireless end-point device and said established link between said host device and said trusted wireless device, using said assumed identity of said trusted wireless device.

7. The method according to claim 1, wherein said wireless end-point device is operable to collect content for said trusted wireless device.

8. The method according to claim 7, comprising relaying said collected content from said wireless end-point device to said trusted wireless device using said assumed identity of said trusted wireless device.

9. The method according to claim 8, wherein said relayed collected content is presented as at least one of visual or audio data on said trusted device.

10. A system for communication, the system comprising:
one or more processors, one or more circuits, or any combination thereof in a host wireless device operable to:
acquire identity information from a trusted wireless device;
establish, through said host wireless device, a link between a wireless end-point device and said trusted wireless device using said acquired identity information as an assumed identity of said trusted wireless device;
relay, through said host wireless device, content between said wireless end-point device and said trusted wireless device via said established link using said assumed identity of said trusted wireless device; and
communicate at least part of said content relayed between said wireless end-point device and said trusted wireless device to a service infrastructure device.

11. The system according to claim 10, wherein said one or more processors, one or more circuits, or any combination thereof is operable to communicate with said wireless end-point device and said trusted wireless device using at least one of a Bluetooth protocol or Bluetooth low energy protocol link.

12. The system according to claim 10, wherein before said identity information is acquired by said host wireless device from said trusted wireless device, said identity information is shared between said trusted wireless device and said wireless end-point device by bonding said trusted wireless device with said wireless end-point device.

13. The system according to claim 10, wherein said one or more processors, one or more circuits, or any combination thereof is operable to relay content between said wireless end-point device and said trusted wireless device without a concurrent link being established between said wireless end-point device and said trusted wireless device.

14. The system according to claim 10, wherein said one or more processors, one or more circuits, or any combination thereof is operable to establish a link between said host wireless device and said trusted wireless device.

15. The system according to claim 14, wherein said one or more processors, one or more circuits, or any combination thereof is operable to relay said content from said trusted wireless device to said wireless end-point device over said established link between said host wireless device and said wireless end-point device and said established link between said host device and said trusted wireless device using said assumed identity of said trusted wireless device.

16. The system according to claim 10, wherein said wireless end-point device is operable to collect content for said trusted wireless device.

17. The system according to claim 16, wherein said one or more processors, one or more circuits, or any combination thereof is operable to relay said collected content from said wireless end-point device to said trusted wireless device using said assumed identity of said trusted wireless device.

18. The system according to claim 17, wherein said relayed collected content is presented as at least one of visual or audio data on said trusted device.

19. A method for communication, the method comprising:
acquiring, by a host wireless device, identity information from a trusted wireless device;
establishing, by said host wireless device, a link to a wireless end-point device using said identity information;
relaying, by and through said host wireless device, content between said wireless end-point device and said trusted wireless device; and
communicating, by said host wireless device, at least part of said content relayed between said wireless end-point device and said trusted wireless device to a service infrastructure device.

20. The method according to claim 19, wherein, before said identity information is acquired by said host wireless device from said trusted wireless device, said identity information is shared between said trusted wireless device and said wireless end-point device by bonding said trusted wireless device with said wireless end-point device.

* * * * *